(12) United States Patent
Uno et al.

(10) Patent No.: US 8,570,146 B2
(45) Date of Patent: Oct. 29, 2013

(54) IN-VEHICLE WIRELESS SYSTEM

(75) Inventors: Hideki Uno, Toyota (JP); Shigeyoshi Toda, Anjo (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 1161 days.

(21) Appl. No.: 12/491,295

(22) Filed: Jun. 25, 2009

(65) Prior Publication Data
US 2009/0322475 A1    Dec. 31, 2009

(30) Foreign Application Priority Data

Jun. 30, 2008    (JP) ................................ 2008-171474

(51) Int. Cl.
| G05B 19/00 | (2006.01) |
| G05B 23/00 | (2006.01) |
| G05B 11/01 | (2006.01) |
| G08B 25/00 | (2006.01) |
| G08B 29/00 | (2006.01) |
| B60Q 1/00  | (2006.01) |
| H03C 7/02  | (2006.01) |
| H04B 1/18  | (2006.01) |
| H03J 7/32  | (2006.01) |
| H04J 1/00  | (2006.01) |

(52) U.S. Cl.
USPC ...... 340/5.64; 340/5.71; 340/12.23; 340/525; 340/425.5; 340/5.62; 455/101; 455/161.1; 455/168.1; 455/165.1; 455/147; 370/343

(58) Field of Classification Search
USPC .......... 340/5.2, 5.23, 5.31, 5.64, 5.71, 825.69, 340/5.7, 825.22, 525, 461, 539, 825.72, 340/5.62; 455/41.1, 68, 88, 569.2, 575.1, 455/90.1, 99, 151.2, 259; 343/895, 853
See application file for complete search history.

(56) References Cited

U.S. PATENT DOCUMENTS

| 4,771,283 | A |   | 9/1988  | Imoto           |            |
| 5,442,340 | A |   | 8/1995  | Dykema          |            |
| 5,479,155 | A |   | 12/1995 | Zeinstra et al. |            |
| 5,583,485 | A |   | 12/1996 | Van Lente et al.|            |
| 5,612,981 | A |   | 3/1997  | Huizer          |            |
| 5,614,885 | A |   | 3/1997  | Van Lente et al.|            |
| 5,619,190 | A |   | 4/1997  | Duckworth et al.|            |
| 5,627,529 | A | * | 5/1997  | Duckworth et al.| 340/12.24  |
| 5,646,701 | A |   | 7/1997  | Duckworth et al.|            |

(Continued)

FOREIGN PATENT DOCUMENTS

JP    7-290952    11/1995

OTHER PUBLICATIONS

English language Abstract of JP 7-290952, Nov. 7, 1995.

*Primary Examiner* — Jennifer Mehmood
*Assistant Examiner* — Mirza Alam
(74) *Attorney, Agent, or Firm* — Greenblum & Bernstein, P.L.C.

(57) ABSTRACT

An in-vehicle wireless system, capable of operating at least in a copy mode and a transmission mode, comprises: at least one receiving unit receiving a wireless signal transmitted from a remote control transmitter and demodulates a control code signal; and at least one transmitting unit transmitting wireless signals at a plurality of carrier frequencies; and a control unit controlling so as to obtain a control code from the control code signal and store it in the copy mode, and so as to perform transmitting the modulated wireless signals at all carrier frequencies unique to a plurality of the garage door opening-closing mechanisms or the like. The receiving unit may include a detection circuit connected to a reception antenna directly.

18 Claims, 16 Drawing Sheets

(56) References Cited

U.S. PATENT DOCUMENTS

| | | | |
|---|---|---|---|
| 5,661,804 A | 8/1997 | Dykema et al. | |
| 5,699,054 A | 12/1997 | Duckworth | |
| 5,708,415 A * | 1/1998 | Van Lente et al. | 340/525 |
| 5,854,593 A * | 12/1998 | Dykema et al. | 340/12.23 |
| 5,903,226 A | 5/1999 | Suman et al. | |
| 6,137,421 A | 10/2000 | Dykema et al. | |
| 6,486,795 B1 * | 11/2002 | Sobel et al. | 340/13.21 |
| 6,583,753 B1 * | 6/2003 | Reed | 342/70 |
| 2004/0125074 A1 * | 7/2004 | Lin | 345/156 |
| 2006/0181428 A1 * | 8/2006 | Blaker et al. | 340/825.22 |
| 2006/0250214 A1 * | 11/2006 | Mafune et al. | 340/5.62 |
| 2007/0202818 A1 * | 8/2007 | Okamoto | 455/101 |

* cited by examiner

IN-VEHICLE WIRELESS SYSTEM

CROSS-REFERENCE TO RELATED APPLICATIONS

The present application claims priority under 35 U.S.C. §119 of Japanese Patent Application No. 2008-171474, filed on Jun. 30, 2008, the disclosure of which is expressly incorporated by reference herein in its entirety.

BACKGROUND OF THE INVENTION

1. Field of the Invention

The present invention relates to a wireless system to be mounted on a vehicle, and more particularly, to an in-vehicle wireless system that receives and copies high-frequency wireless signals from transmitters that remotely control garage door opening-closing mechanisms, household equipments, and the likes, and transmits high-frequency wireless signals for operating the garage door opening-closing mechanisms and the likes.

2. Description of the Related Art

As remote controllers for controlling various household electric equipments and devices from a distance have widely spread, universal remote controllers that can remotely control devices and equipments with a single controller are now used in some places. Since infrared rays are used for remotely controlling most household electric equipments, a typical universal remote controller is designed to receive and copy an optical signal transmitted from the remote controller of an equipment or the like, and transmit an optical signal based on the copy to a selected equipment or the like when controlling the equipment.

Likewise, remote controllers for controlling garage door opening-closing mechanisms and the like have widely spread, and each remote controller is specially designed for each corresponding mechanism. However, having more than one remote controller and operating the remote controllers separately from one another in a vehicle is not convenient to users. Therefore, there are some in-vehicle wireless systems that can perform remote control on two or more garage door opening-closing mechanisms and the likes with a single remote control.

While optical signals are normally used for remotely controlling household electric equipments and the likes, wireless high-frequency signals are mainly used for remotely controlling garage door opening-closing mechanisms and the likes. This is because the control operation needs to be made possible even if the receiver of the target mechanism cannot be seen from the transmitter in the vehicle.

In most remote control operations with the use of optical signals, infrared rays of 940 nm in wavelength are modulated by frequencies in the neighborhood of 40 kHz, and PPM (Pulse Position Modulation) control codes are transmitted. Accordingly, the universal remote controllers should copy the switching on and off of the optical signals (for example, refer to Related Art 1).

On the other hand, most wireless signals used in garage door opening-closing mechanisms and the likes are high-frequency signals in a UHF band, but the carrier frequencies of high-frequency signals greatly vary among the manufacturers and product lines of the equipments. Therefore, an in-vehicle wireless system that can use for various types of garage door opening-closing mechanism and the likes need to copy the carrier frequency unique to each of the garage door opening-closing mechanisms and the likes, and the control codes contained in the high-frequency signals (for example, refer to Related Arts 2 to 14).

Conventional transmitters and receivers used in remote control operations garage door opening-closing mechanisms and the likes have simple structures for reductions in size and price. Such as, the transmitter including an oscillation circuit and an antenna that share a loop coil, the receiver of the superheterodyne type including a simple resonant circuit, or the like. In cases where such transmitters and receivers are used, the accuracy and stability of the frequencies are poorer, and the performances are degraded due to environmental changes such as temperature changes and deterioration caused with time. In some cases, there is the problem of a decrease in the distance over which transmission can be performed between a transmitter and a receiver.

[Related Art 1] U.S. Pat. No. 4,771,283
[Related Art 2] Japanese Laid-open Patent Publication No. H07-290952,
[Related Art 3] U.S. Pat. No. 5,442,340
[Related Art 4] U.S. Pat. No. 5,479,155
[Related Art 5] U.S. Pat. No. 5,583,485
[Related Art 6] U.S. Pat. No. 5,614,885
[Related Art 7] U.S. Pat. No. 5,612,981
[Related Art 8] U.S. Pat. No. 5,646,701
[Related Art 9] U.S. Pat. No. 5,661,804
[Related Art 10] U.S. Pat. No. 5,699,054
[Related Art 11] U.S. Pat. No. 5,708,415
[Related Art 12] U.S. Pat. No. 5,903,226
[Related Art 13] U.S. Pat. No. 5,854,593
[Related Art 14] U.S. Pat. No. 6,137,421

As described above, there have been in-vehicle wireless systems that can perform copying and can perform high-frequency wireless remote control on garage door opening-closing mechanisms and the likes with the use of one transmission/reception device from inside a vehicle.

In the conventional in-vehicle wireless systems that can perform copying, however, it is firstly necessary to copy both the carrier frequency of a high-frequency signal used for remotely controlling each garage door opening-closing mechanism, and a secret code contained in the signal (the control code). As a result, the high-frequency transmission circuit and reception circuit and the control method become complicated.

Secondly, the frequency characteristics and the likes of the receivers provided in garage door opening-closing mechanisms and the likes and the remote control transmitter are often unstable or frequencies of the wireless signals may be inaccurate, as described above. Also, in some cases, the transmission efficiency becomes lower due to the positions, the directionalities, and the wave polarizations of the transmission and reception antennas provided in the garage door opening-closing mechanisms, the remote control transmitter, and the in-vehicle wireless system. Furthermore, the radio waves to be received might be affected by fading, noise, or the like in some electromagnetic environment in the surrounding area. In those cases, reception becomes difficult, and the transmission distance becomes shorter.

SUMMARY OF THE INVENTION

To counter the above problems, the present invention is to provide a highly-reliable in-vehicle wireless system that certainly receives a wireless signal transmitted from a remote control transmitter, copies the control code, and transmits high-frequency wireless signals to control garage door opening-closing mechanisms or the like in such a manner that the high-frequency wireless signal is certainly received.

The present invention is as follows.

1. An in-vehicle wireless system that is placed in a vehicle so as to control a garage door opening-closing mechanism and/or household equipment that are remotely controlled by a high-frequency wireless signal, and is capable of operating at least in a copy mode and a transmission mode, the in-vehicle wireless system comprising:

at least one receiving unit that receives a wireless signal transmitted from a remote control transmitter for performing control on the garage door opening-closing mechanism and/or household equipment through a reception antenna, and demodulates a control code signal for performing the control from the received signal;

at least one transmitting unit that transmits wireless signals at a plurality of carrier frequencies through a transmission antenna; and a control unit that controls the at least one receiving unit and the at least one transmitting unit, wherein the control unit in the copy mode detects a control code from the control code signal and stores the control code, and the control unit in the transmission mode controls the transmitting unit to perform transmission of a wireless signal modulated by the stored control code, the transmission of the modulated wireless signal being performed at all carrier frequencies unique to a plurality of the garage door opening-closing mechanisms and/or household equipments in accordance with predetermined procedures.

2. The in-vehicle wireless system according to 1 above, wherein:

the wireless signal transmitted from the remote control transmitter is an ASK-modulated high-frequency signal; and the receiving unit includes an envelope detection circuit that is connected to the reception antenna.

3. The in-vehicle wireless system according to 2 above, wherein:

the receiving unit further includes a comparator circuit that compares an output signal of the envelope detection circuit with a reference voltage; and the control unit includes a microcontroller that has a digital input having an output signal of the comparator circuit input thereto.

4. The in-vehicle wireless system according to 2 above, wherein the control unit includes a microcontroller that has an analog input having an output signal of the envelope detection circuit input thereto.

5. The in-vehicle wireless system according to 1 above, wherein:

the control unit includes a carrier frequency setting unit that generates a frequency setting signal for selecting the carrier frequency; and the transmitting unit includes a voltage controlled oscillator circuit that is controlled with the frequency setting signal, and an output circuit that multiplies the frequency of an output signal of the voltage controlled oscillator circuit and ASK-modulates the output signal.

6. The in-vehicle wireless system according to 5 above, wherein:

the transmitting unit further includes a plurality of transmission antennas and an antenna switching circuit that switches between the transmission antennas; and the control unit switches between the transmission antennas to be used by outputting an antenna select signal to the antenna switching circuit.

7. The in-vehicle wireless system according to 6 above, wherein each of the transmission antennas has a different antenna center frequency or a different transmission wave polarization from the other transmission antennas.

8. The in-vehicle wireless system according to 1 above, wherein each of the transmitting units includes a transmission antenna having a different antenna center frequency or a different transmission wave polarization from transmission antennas of the other transmission units.

9. The in-vehicle wireless system according to 1 above, wherein the transmitting units transmit the wireless signals at the same carrier frequency from all the transmitting units in turn.

10. The in-vehicle wireless system according to 1 above, wherein the transmitting units simultaneously transmit the wireless signals at the different carrier frequencies.

11. The in-vehicle wireless system according to 1 above, wherein the predetermined procedures are carried out to perform transmitting the wireless signals successively in ascending or descending order of the carrier frequency.

12. The in-vehicle wireless system according to 10 above, wherein the predetermined procedures are carried out so that one of the two transmitting units performs transmitting the wireless signals successively in ascending order of the carrier frequency, and the other one of the two transmitting units performs transmitting the wireless signals successively in descending order of the carrier frequency.

13. The in-vehicle wireless system according to 2 above, wherein:

each of the receiving units has a reception antenna having a different reception sensitivity with respect to a center frequency or wave polarization from reception antennas of the other receiving units; and the control unit detects the control code by selecting or processing the control code signals that are input from the respective receiving units.

14. The in-vehicle wireless system according to 6 above, further comprising a transmission antenna unit that includes the transmission antenna and is located at a distance, wherein:

the transmission antenna unit is connected to the output circuit with a high-frequency cable, the control unit includes a circuit that superimposes the antenna select signal as a DC voltage on the high-frequency cable; and the transmission antenna Unit includes the antenna switching circuit that is activated by value of the DC voltage.

15. The in-vehicle wireless system according to 5 above, further comprising a transmission antenna unit that includes the transmission antenna and is located at a distance, wherein:

the transmission antenna unit is connected to the output circuit with a high-frequency cable, the control unit includes a circuit that superimposes an impedance matching signal as a DC voltage on the high-frequency cable, the impedance matching signal being for impedance matching with the transmission antenna; and the transmission antenna unit includes the impedance matching circuit that is activated by value of the DC voltage.

16. The in-vehicle wireless system according to 1 above, wherein the control unit receives data for updating the garage door opening-closing mechanism and/or household equipment or the control procedures through the receiving unit, and changes the carrier frequency and/or the control procedures in accordance with the data.

17. The in-vehicle wireless system according to 3 above, wherein:

the control unit includes a carrier frequency setting unit that generates a frequency setting signal for selecting the carrier frequency; and the transmitting unit includes a voltage controlled oscillator circuit that is controlled with the frequency setting signal, and an output circuit that multiplies the frequency of an output signal of the voltage controlled oscillator circuit and ASK-modulates the output signal.

18. The in-vehicle wireless system according to 17 above, wherein the predetermined procedures are carried out to perform transmitting the wireless signals in ascending or descending order of the carrier frequency.

In an in-vehicle wireless system of the present invention, a high-frequency wireless signal transmitted from a remote control transmitter can be certainly received by one or more receiving units without a tuning circuit, and the control code contained in the signal can be certainly copied by a control unit. The control unit performs a control operation through predetermined procedures, so that one or more transmitting units transmit high-frequency wireless signals of carrier frequencies unique to each of garage door opening-closing mechanisms and/or household equipments. Accordingly, the reception reliability in the garage door opening-closing mechanisms and/or household equipments can be increased.

A receiving unit that includes an envelope detection circuit connected to a reception antenna can demodulate the control code with a simple circuit. Thus, a small-sized, highly-reliable in-vehicle wireless system can be realized.

The receiving unit further includes a comparator circuit for the output signal of the envelope detection circuit. The output signal of the comparator circuit is input to a digital input of a microcontroller. In this manner, the control code can be obtained with a simple circuit and a simple control method.

The output signal of the envelope detection circuit is input to an analog input of a microcontroller, so that flexible signal processing and detection of the control codes become possible.

In a case where the control unit includes a carrier frequency setting unit for selecting the carrier frequency, and the transmitting unit includes a voltage controlled oscillator circuit to be controlled by the output of the carrier frequency setting unit and an output circuit that performs ASK modulation, a high-frequency signal of the carrier frequency unique to each of the garage door opening-closing mechanisms and/or household equipment can be accurately generated through a simple control operation.

In a case where the transmitting unit further includes a plurality of transmission antennas and an antenna switching circuit for switching between the transmission antennas, so as to realize diversity in transmission waves, the reception state of each of the garage door opening-closing mechanisms and/or household equipments is improved, and the reception reliability becomes higher.

With the use of antennas having different center frequencies as the transmission antennas, the intensity of transmission waves can be secured in accordance with the carrier frequency of the high-frequency signal to be transmitted. With the use of antennas having different wave polarizations as the transmission antennas, diversity in the transmission wave polarization is realized. Accordingly, the reception state of each of the garage door opening-closing mechanisms and/or household equipments is improved, and the reception reliability becomes higher.

In a case where the transmitting units include transmission antennas having different center frequencies from each other, transmission can be simultaneously performed at different frequencies with the use of transmitting units corresponding to the carrier frequency. Thus, the time required for performing transmission at all the predetermined carrier frequencies can be shortened. Also, with transmission antennas having different transmission wave polarizations, diversity transmission can be efficiently performed.

In a case where the transmitting units transmit the wireless signals at the same carrier frequency from all the transmitting units in turn, the reception reliability of the garage door opening-closing mechanisms and/or household equipments can be increased.

In a case where the transmitting units simultaneously transmit the wireless signals at different carrier frequencies, the time required for performing transmission at all the predetermined carrier frequencies can be shortened.

The predetermined procedures may be carried out to perform transmitting the wireless signals successively in ascending order or descending order of carrier frequency. In this manner, transmission can be performed at all the predetermined carrier frequencies in accordance with a simple control program.

The predetermined procedures may be carried out by one of the two transmitting units to perform transmitting the wireless signals successively in ascending order of carrier frequency, and by the other one of the two transmitting units to perform transmitting the wireless signals successively in descending order of carrier frequency. In this manner, the time required for performing transmission at all the predetermined carrier frequencies can be shortened.

If the receiving units include reception antennas having different center frequencies from each other, reception can be certainly performed, regardless of the carrier frequencies of received wireless signals. If the receiving units include reception antennas having different reception sensitivities with respect to the wave polarization, reception can be certainly performed, regardless of the polarizations of received radio waves. In a case where the control unit selects or processes the control code signals that are output from the respective receiving units, the control codes can be certainly obtained.

In a case where a transmission antenna unit including the transmission antennas is placed at a distance, and the transmission antenna unit is connected to the output circuit with a high-frequency cable, the control unit in this in-vehicle wireless system includes a circuit that superimposes the antenna selecting signal as a DC voltage on the high-frequency cable, the transmission antenna unit includes the antenna switching circuit that is operated by value of the DC voltage, the diversity effect can be achieved even in a case where the transmission antennas are placed at a remote place optimum for transmission.

In a case where a transmission antenna unit including the transmission antenna is placed at a distance, and the transmission antenna unit is connected to the output circuit with a high-frequency cable, the control unit of the in-vehicle wireless system includes a circuit that superimposes an impedance matching signal for performing impedance matching on the transmission antenna as DC voltage on the high-frequency cable, The transmission antenna unit includes the impedance matching circuit that is operated by value of the DC voltage, impedance matching can be performed on the impedance varying with the carrier frequency of the signal to be transmitted, and wave transmission can be performed efficiently even in a case where the transmission antenna is placed in a remote place optimum for transmission.

In a case where the control unit receives data for updating the garage door opening-closing mechanisms and/or household equipments or the control procedures, from the receiving unit, according to the data, the control unit changes the carrier frequency and/or the control procedures, the maintainability of the in-vehicle wireless system can be increased, and users can comfortably continue to use the in-vehicle wireless system even if there is a change in the garage door opening-closing mechanisms and/or household equipments.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An in-vehicle wireless system of the present invention is mounted in a vehicle so as to control at least one garage door opening-closing mechanism or the like, and can operate at least in a copy mode and a transmission mode.

Figure 1:
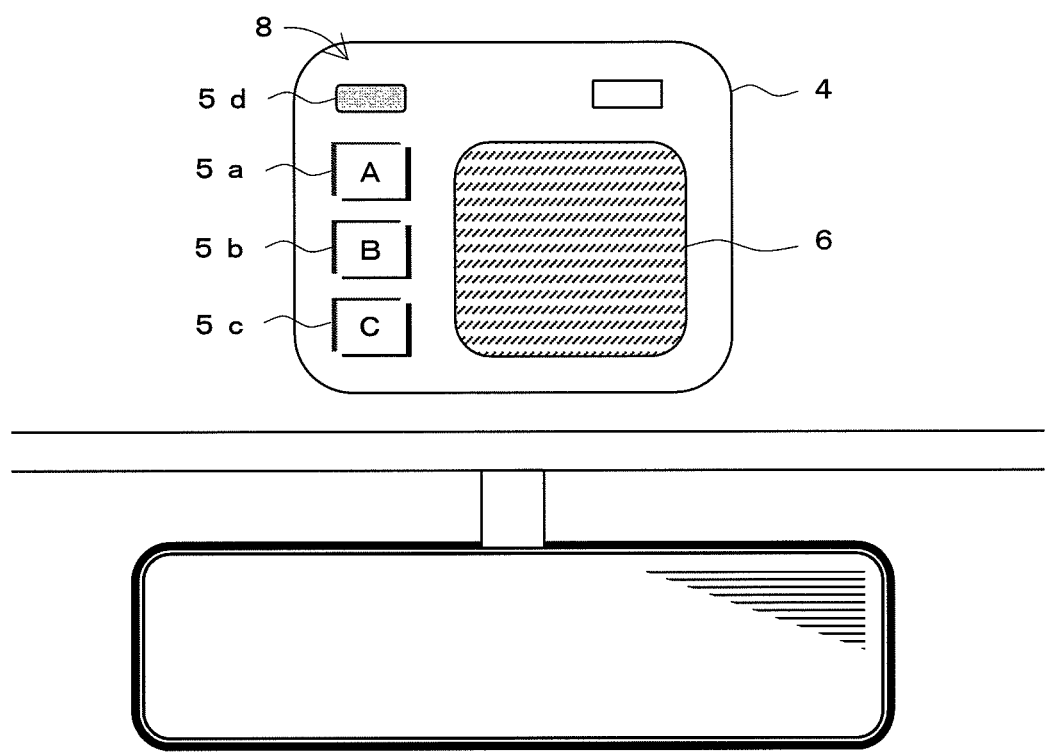
FIG. 1 illustrates an example case where an in-vehicle wireless system is incorporated into an overhead console unit in a vehicle.

This in-vehicle wireless system can be incorporated into or mounted on a console unit in the vehicle, a rear view mirror unit, a part of a seat, or the like. FIG. 1 illustrates an example case where this in-vehicle wireless system is incorporated into the overhead console unit in a vehicle. The in-vehicle wireless system 8 is incorporated into an overhead console unit 4. The in-vehicle wireless system 8 has manual operation buttons A, B, and C (5a, 5b, and 5c) for the user to select an operation between a copy mode operation and a transmission mode operation, and an indicator 5d for notifying the user of the operating status or the like of the in-vehicle wireless system. Instead of the indicator 5d, a display device or an interior light 6 or the like that is built in the vehicle may be used. The three operation buttons are allotted to three garage door opening-closing mechanisms and the likes, so that a control code can be copied among the three garage door opening-closing mechanisms, and control operations can be performed.

1. Structure of In-Vehicle Wireless System

Figure 2:
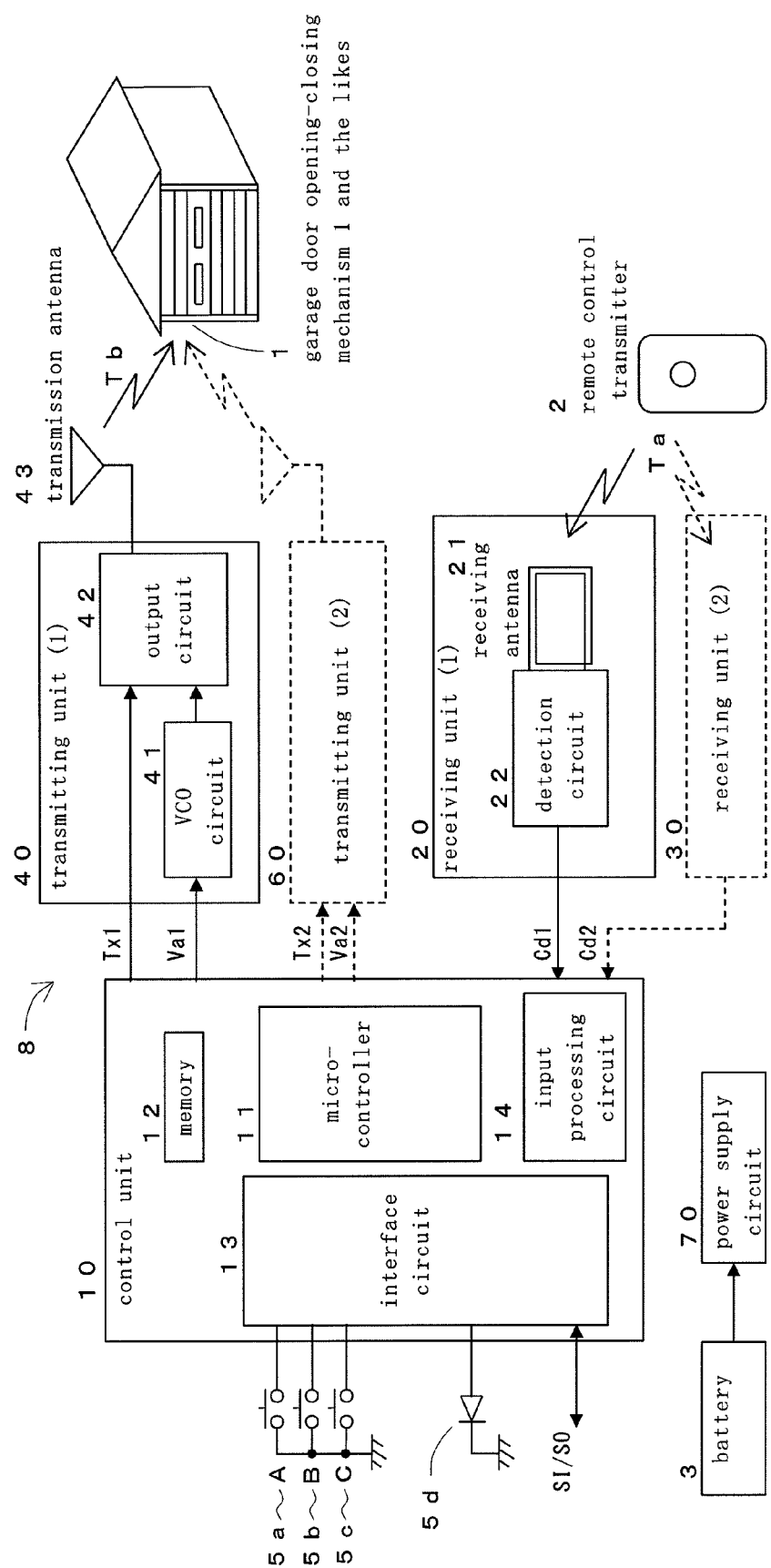
FIG. 2 is a block diagram showing a fundamental structure of the in-vehicle wireless system.

FIG. 2 is a block diagram showing a fundamental embodiment of an in-vehicle wireless system of the present invention. Referring to FIG. 2, the structure of the in-vehicle wireless system is described below.

A typical example of the control object of the in-vehicle wireless system 8 is a garage door opening-closing mechanism 1. However, the control object of the in-vehicle wireless system 8 is not limited to that, and may be any household equipment or device that can be remotely controlled with wireless high-frequency signals, such as a gate of a house, an entrance door, a lighting equipment, or an air-conditioning equipment (those equipments and devices will be hereinafter collectively referred to as "the garage door opening-closing mechanism and the likes"). A control code is copied among the garage door opening-closing mechanism and the likes to be controlled, so that the in-vehicle wireless system 8 can collectively control the garage door opening-closing mechanism and the likes.

A remote control transmitter 2 is a transmitter accompanying the garage door opening-closing mechanism 1 and the likes. The garage door opening-closing mechanism 1 and the likes is activated by a wireless signal Ta that is originally transmitted from the remote control transmitter 2. The wireless signal is a high-frequency signal that is modulated by a control code. The control codes and the carrier frequency of the wireless signal Ta are unique to the garage door opening-closing mechanism 1 and the likes.

The carrier frequency of the high-frequency wireless signal is mainly in a ultrahigh frequency (UHF: 300 MHz to 3 GHz) band, but the technical spirit of the present invention is not limited to this frequency band. In the in-vehicle wireless system, transmitting and receiving units that can cope with frequency bands including the frequencies used in various garage door opening-closing mechanisms available on the market (hereinafter referred to as the target frequency band) are used. For example, in a case where the carrier frequency used in the garage door opening-closing mechanism and the likes ranges from 200 MHz to 450 MHz, the in-vehicle wireless system is designed to transmit and receive high-frequency signals within such a frequency range.

To modulate the high-frequency signal, the amplitude shift keying (ASK) modulation method is used in many garage door opening-closing mechanisms and the likes. Therefore, ASK modulation is mainly performed in this in-vehicle wireless system, the spirit of the present invention can be applied to other modulation methods.

A high-frequency wireless signal Tb is transmitted from the in-vehicle wireless system 8 to the garage door opening-closing mechanism 1 and the likes. In the copy mode, the in-vehicle wireless system 8 receives the high-frequency wireless signal Ta transmitted from the remote control transmitter 2, and acquires and stores only the unique control code. In the transmission mode, the in-vehicle wireless system 8 transmits the high-frequency wireless signal Tb modulated by the control code stored in the copy mode, to the predetermined garage door opening-closing mechanism and the likes, at all the inherent carrier frequencies. As the transmission includes a transmitting process at the same carrier frequency as the carrier frequency of the wireless signal Ta, the target garage door opening-closing mechanism 1 and the likes is activated.

The in-vehicle wireless system 8 includes a receiving unit 20, a transmitting unit 40, and a control unit 10 that are the principal components of the present invention. The in-vehicle wireless system 8 may further include several other receiving units such as a second receiving unit 30 in addition to the first receiving unit 20. Also, the in-vehicle wireless system 8 may further include several other transmitting units such as a second transmitting unit 60 in addition to the first transmitting unit 40.

The in-vehicle wireless system 8 further includes an operating unit and a power supply circuit 70.

The operating unit includes manual operation buttons A, B, and C (5a, 5b, and 5c), and an indicator 5d. Those parts have been described above, and the numbers and functions of manual operation buttons and indicators may be changed if necessary.

The power supply circuit 70 is connected to a battery 3 that is mounted on the vehicle and is normally a 12-V battery. The power supply circuit 70 supplies power of approximately 5 V to the electronic circuits in the in-vehicle wireless system 8. The power supply circuit 70 is designed to supply stable power to the electronic circuits in the system, despite a large variation in voltage of the battery 3. In this manner, surges of electricity and noise voltage and current can be prevented.

(1) Receiving Unit

The receiving unit 20 includes a reception antenna 21 for receiving the high-frequency wireless signal Ta transmitted from the remote control transmitter 2, and a detection circuit 22 for demodulating the control code signal from the received high-frequency signal. As described above, since the in-vehicle wireless system 8 does not need to copy the carrier frequency of the wireless signal Ta, the receiving unit 20 does not need to have a tuning circuit, and can be formed with the minimum number of parts and a simple circuit.

The reception antenna 21 is an antenna that can receive signals in the target frequency band, and should preferably be small in size, though it may be of any kind or form. For example, it is possible to use any antenna such as a loop antenna, a loop antenna formed by winding a conductive wire in a coil-like fashion, a helical antenna, and a planar antenna of any kind. Normally, the remote control transmitter 2 and the in-vehicle wireless system 8 are used in the same vehicle in the copy mode. Therefore, the reception antenna 21 should preferably be placed so as to receive only radio waves transmitted from inside the vehicle.

The detection circuit 22 is connected to the reception antenna 21. In a signal demodulating process by the ASK method, an envelope detection circuit can be used. In a conventional wireless system that has a learning function, it is necessary to learn the carrier frequency of each high-frequency signal to be received. Therefore, a tuning circuit or a superheterodyne receiving circuit that includes a local oscillator has been normally used. In this in-vehicle wireless system, however, such a circuit is not required, and a code signal can be demodulated directly from a received signal by an envelope detection circuit that includes a diode or the like. To be able to greatly reduce the number of parts and employ a simple receiving circuit is an advantage of the present invention, as extracting only the control code from a high-frequency signal is sufficient.

Figure 3:
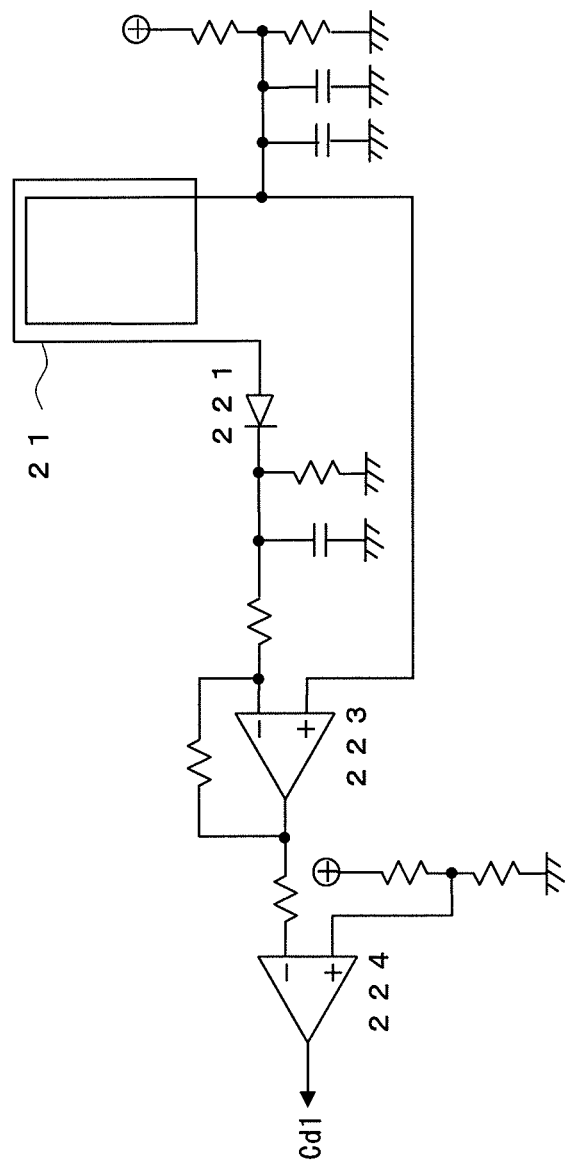
FIG. 3 is a circuit diagram showing a typical example structure of a receiving unit.

The receiving unit 20 including the envelope detection circuit basically has the structure illustrated in FIG. 3. The detection circuit 22 includes a detection diode 221 and a received-signal amplifier 223. A high-frequency signal received by the reception antenna 21 is detected by the diode 221, and is amplified by the received-signal amplifier 223.

However, a detection circuit including a diode normally has characteristics varying with ambient temperature. Therefore, two diodes having the same temperature characteristics are used to form the envelope detection circuit, so that temperature compensating can be performed, if necessary.

The detection circuit may also have, if necessary, an amplifier and/or a bandpass filter at the portion to receive signals from the reception antenna 21. The bandpass filter is a filter that filters signals in the target frequency band. Alternatively, the same number of narrow bandpass filters as the number of different frequencies may be provided in parallel, so as to filter only the frequencies unique to the garage door opening-closing mechanism and the likes. In this manner, only the signals at the unique frequencies are selectively filtered.

A signal Cd1 (hereinafter referred to as the control code signal) demodulated by the detection circuit is transmitted to the control unit 10, after waveform shaping, if necessary. In the circuit illustrated in FIG. 3, the amplified signal is compared with a reference voltage by a comparator 224, and the binary control code signal Cd1 is output.

As shown in FIG. 2, the in-vehicle wireless system 8 may include more than one receiving unit, such as two receiving units 20 and 30. When the wireless signal Ta is received from the remote control transmitter 2, the reception state varies with the directionality, the polarization, and the likes of the radio waves transmitted from the transmitter 2. The reception state also varies with the electromagnetic environment such as fading and unnecessary waves in the surrounding area. For example, because a null point is formed due to the directionality of the transmission antenna or reflected radio waves, and the wireless signal Ta cannot be received.

To counter this problem, a diversity system that receives signals with the use of two or more antennas has been developed. In this in-vehicle wireless system, the reception antennas provided for the receiving units are properly selected and placed, so that spatial diversity or polarization diversity can be realized. For example, loop antennas having conductive wires wound in a coil-like fashion may be used as the reception antennas provided for the two receiving units 20 and 30, so as to realize spatial diversity. Alternatively, antennas having different directionalities may be used. Also, one of the two receiving units 20 and 30 may have a reception antenna corresponding to horizontal polarization, and the other one of the two receiving units 20 and 30 may have a reception antenna corresponding to vertical polarization. In this manner, polarization diversity can be realized.

Also, the two receiving units 20 and 30 may have antennas of different frequency characteristics from each other. More specifically, a reception antenna that is highly sensitive in the lower frequency region within the target frequency band, and a reception antenna that is highly sensitive in the higher frequency region are used, so that the reception performance of the in-vehicle wireless system in the entire target frequency band can be increased.

In any of the above cases, the receiving units 20 and 30 may have antennas of different kinds from each other.

(2) Transmitting Unit

The transmitting unit 40 transmits a high-frequency wireless signal modulated by the control code obtained in the copy mode, to the garage door opening-closing mechanism 1 and the likes. The in-vehicle wireless system 8 obtains only the control code in the copy mode. Therefore, it is necessary to perform transmission at all the carrier frequencies unique to the predetermined garage door opening-closing mechanisms and the likes.

As shown in FIG. 2, the transmitting unit 40 includes a voltage controlled oscillator circuit 41, an output circuit 42, and a transmission antenna 43. The transmitting unit 40 is connected to the control unit 10.

The voltage controlled oscillator (VCO) circuit 41 controls its oscillation frequency in accordance with the voltage value of a frequency setting signal Va1 that is output from the control unit 10 so as to set the carrier frequency.

Figure 4:
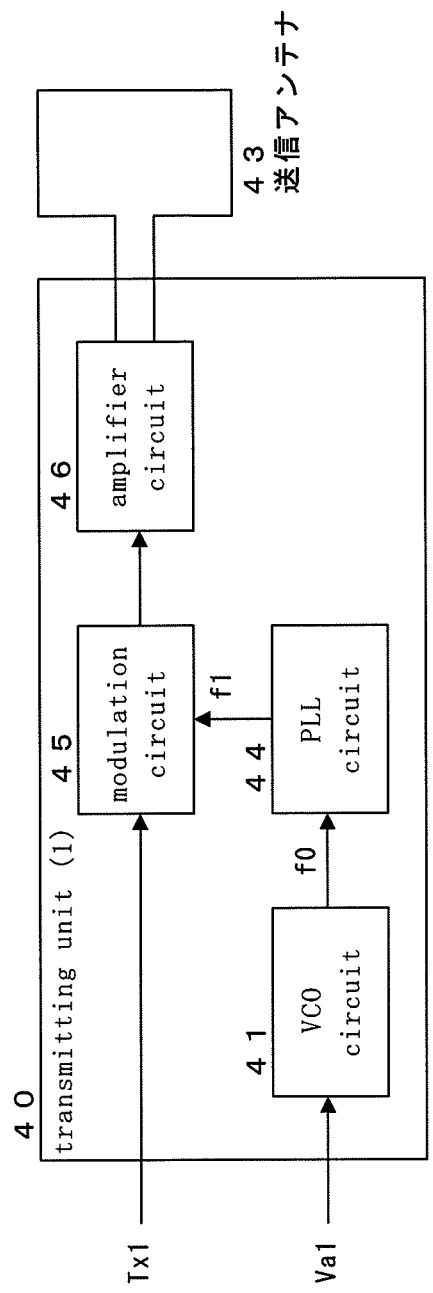
FIG. 4 is a block diagram showing a typical example structure of a transmitting unit.

As shown in FIG. 4, the output circuit 42 includes a phase synchronizing circuit 44, a modulation circuit 45, and an amplifier circuit 46.

The phase-locked loop circuit (or PLL) 44 is a circuit that generates high-frequency signals of the carrier frequencies. An output signal f0 of the VCO circuit 41 is input to the PLL circuit 44. The PLL circuit 44 can generate signals formed by multiplying the frequencies of input signals. For example, the PLL circuit 44 generates an output signal f1 of the frequency 32 times higher than the frequency of the signal f0 that is input from the VCO circuit 41. The frequency of the output signal f1 is the carrier frequency to be transmitted, and is supplied to the modulation circuit 45.

The modulation circuit 45 is connected to the control unit 10, and is input a transmission code signal Tx1 output from the control unit 10. The modulation circuit 45 modulates the high-frequency signal f1 generated from the PLL circuit 44 by the transmission code signal Tx1. In an ASK modulating operation, a high-frequency signal that has amplitude varying with the transmission code signal Tx1 is generated.

The amplifier circuit 46 amplifies the power of the high-frequency signal modulated by the modulation circuit 45, and supplies the high-frequency signal to the transmission antenna 43.

As the impedance of an antenna varies with frequencies, the power loss increases depending on the frequency to be transmitted. To counter this problem, a circuit for supplying power from the amplifier circuit 46 to the transmission antenna may include an impedance matching circuit (not shown) that includes a variable capacitance diode or the like. Also, it is possible to add an impedance correcting circuit that detects the radio waves reflected from the transmission antenna and corrects the impedance on the power supply side with the use of a variable capacitance diode or the like The transmission antenna 43 shown in FIG. 2 transmits the amplified high-frequency signal as a radio wave. As the transmission antenna 43, it is possible to select an optimum type of antenna from various types, such as a loop antenna, a whip antenna, a dipole antenna, and a planar antenna.

Depending on the power, the directionality, and the polarization of the radio wave transmitted from the transmission antenna 43, the reception state of the garage door opening-closing mechanism 1 and the likes to be controlled changes. For example, a null point is formed due to the directionality of the transmission antenna or the wave reflection or the like, and reception becomes impossible in some cases. Also, the reception state changes with the electromagnetic environments such as fading or unnecessary waves in the surrounding area, and the reach of the transmitted waves is affected by the changes of the reception state.

To counter this problem, antennas of the same type or different types are provided so as to realize diversity transmission. Particularly, in an in-vehicle wireless system, diversity transmission is effective, as the influence of the vehicle made of metal becomes very large in some places in the vehicle.

More specifically, two or more antennas are prepared for the single transmitting unit 40, and an antenna switching circuit that switches between the antennas is used so as to provide spatial diversity. It is possible to use antennas of different directionalities together, such as a loop antenna and a whip antenna. Also, polarization diversity can be realized by transmitting horizontal polarization waves from a transmission antenna and transmitting vertical polarization waves from the other transmission antenna. It is also possible to utilize a technique for switching between left circular polarization and right circular polarization.

The control unit 10 outputs a switch signal to the antenna switching circuit, so as to switch the transmission antennas to be used. In this manner, the same carrier frequency modulated by the same transmission code can be transmitted with the use of two antennas.

The in-vehicle wireless system also needs to perform transmission at many frequencies existing within the target frequency band. However, the intensity of the transmitted radio waves varies depending on the frequencies of signals, even if the signals are supplied to antennas with fixed power. Each antenna has the frequency (the center frequency) at which radio waves can be most efficiently transmitted. Therefore, an antenna having a center frequency in the lower frequency region of the target frequency band and an antenna having a center frequency in the higher frequency region of the target frequency band are prepared, and the antenna to be used is selected in accordance with the carrier frequency at which transmission is to be performed. In this manner, efficient transmission of radio waves can be performed in the entire target frequency band.

To switch between two transmission antennas, a switch signal is output from the control unit 10 to the antenna switching circuit, as described above.

The in-vehicle wireless system 8 may include more than one transmitting unit, for example, the two transmitting units 40 and 60 shown in FIG. 2.

The two transmitting units can alternately transmit wireless signals that are modulated by the same transmission code and have the same carrier frequency. In this manner, the reliability of the garage door opening-closing mechanisms and the likes can be increased in terms of reception.

With the two transmitting units, wireless signals that are modulated by the same transmission code and have different carrier frequencies can be transmitted at the same time. In this manner, the time required for transmission at all the predetermined carrier frequencies can be shortened.

Furthermore, with the transmitting units, it is possible to achieve the same transmission diversity effect as in the case where two or more transmission antennas are provided in one transmitting unit.

(3) Control Unit

As shown in FIG. 2, the control unit 10 includes an interface circuit 13, an input processing circuit 14, a microcontroller 11, and a memory 12. In this specification, a "microcontroller" is an integrated circuit that has parallel input and output, serial input and output, the later described PWM signal output, and analog input and output and the like that are formed around a microprocessor. Accordingly, a "microcontroller" may be formed with a CPU and the above mentioned various input and output devices.

The interface circuit 13 includes input circuits for the manual operation buttons 5a, 5b, and 5c, and an output circuit for the indicator 5d. The interface circuit 13 is connected to the input and output of the microcontroller 11.

The memory 12 is a rewritable nonvolatile memory such as a flash memory, and may be built in the microcontroller 11.

The input processing circuit 14 is connected to the receiving unit 20. The control code signal demodulated by the detection circuit 22 is input to the input processing circuit 14. The input processing circuit 14 may include a comparator circuit that compares the control code signal with the reference voltage. The control code signal (Cd1) binarized by the comparator circuit is input to the digital input of the microcontroller 11. The control code signal may not pass through the comparator circuit, but may be input to an A-D converter provided in the microcontroller 11 and be subjected to signal processing through a digital conversion or software.

In a case where two or more receiving units 20 and 30 and the likes are provided, the input processing circuit 14 may further include a unit for operating or selecting control code signals (Cd1, Cd2, and the likes) that are outputs from the respective receiving units. For example, the control code signals are operated (logical AND operated or logical OR operated) by a logic circuit. The input processing circuit 14 may further include a unit that detects the levels of receiving signals, and selects the control code signal of the receiving unit having the higher reception level. With such an operating or selecting unit, it is possible to extract the control code with precision, even in a case where there is a difference between the reception states of the reception antennas. Alternatively, such an operating or selecting unit is not provided in the input processing circuit 14, but the equivalent processings may be realized by software of the microcontroller 11.

The control code signal is input to the microcontroller 11 via the input processing circuit 14 or directly from the receiving unit 20. The microcontroller detects the control code from the control code signal, and stores the control code into the memory 12.

As shown in FIG. 2, the control unit 10 is connected to the transmitting unit 40, and controls the transmitting unit 40 in the transmission mode.

In the transmission mode, the code signal Tx1 to be transmitted is sent from the microcontroller 11 to the transmitting unit 40. More specifically, the microcontroller 11 reads the control code, which is stored in the copy mode, from the memory 12, and sends the bit string of the control code as the transmission code signal Tx1 to the modulation circuit 45.

The control unit 10 further includes a carrier frequency setting unit for setting the carrier frequency of the high-frequency signal to be transmitted.

The carrier frequency setting unit is realized by the function and peripheral circuit of the microcontroller 11, and outputs the frequency setting signal (Va1) that is the signal for controlling the oscillation frequency of the VCO circuit 41. More specifically, the carrier frequency setting unit first outputs a PWM signal with the use of a pulse width modulating (PWM) circuit that is provided in the microcontroller 11. The output PWM signal is converted into a voltage value by a smoothing circuit in accordance with the pulse width of the PWM signal. The oscillation frequency of the VCO circuit 41 is controlled with the voltage value (the frequency setting signal Va1). However, the voltage value for controlling the VCO circuit 41 may not be generated with the use of the PWM signal, but may be generated with the use of an output from a D-A converter, for example.

In a case where the transmitting unit 40 includes the antenna switching circuit, the control unit 10 outputs a switch signal to the antenna switching circuit.

2. Method for Controlling In-Vehicle Wireless System

Figure 5:
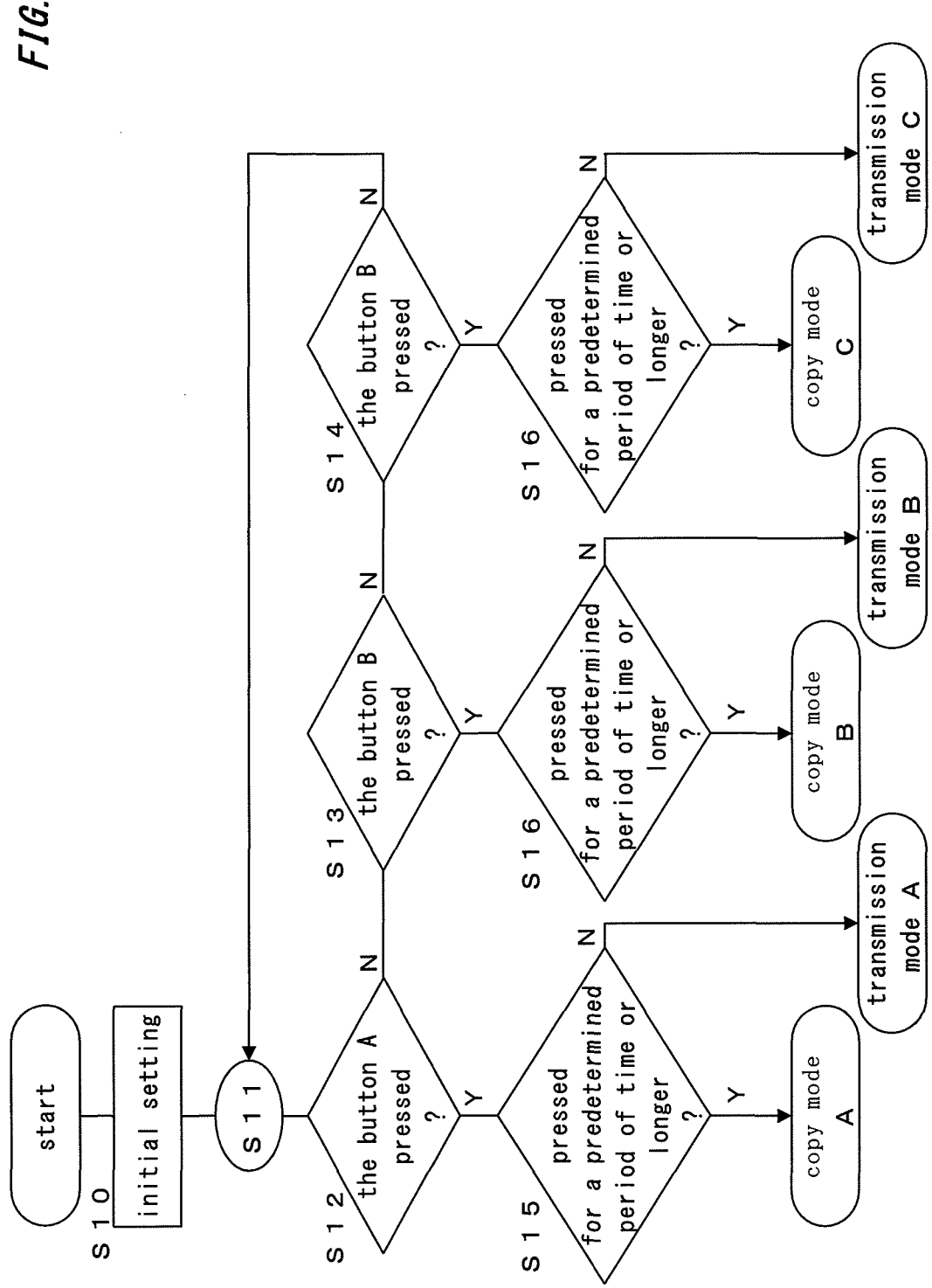
FIG. 5 is a flowchart illustrating a method for controlling the in-vehicle wireless system.

Referring now to the flowchart shown in FIG. 5, a method for controlling the entire in-vehicle wireless system is described. As mentioned above, the numbers and functions of manual operation buttons and indicators may be changed.

First, when the in-vehicle wireless system 8 is activated, initial setting and operation checking are performed on the microcontroller 11 and the other electronic circuits (S10).

After that, the manual operation buttons A, B, and C are monitored (S12, S13, and S14), and the in-vehicle wireless system 8 stands by until one of the manual operation buttons is pressed.

If one of the manual operation buttons is pressed, the time when the operation button is pressed is determined (S15, S16, or S17), and an operation is started in a copy mode or in a transmission mode in accordance with the pressed operation button. If the operation button is pressed for a short period of time, the operation is performed in the transmission mode. If the operation buttons is pressed for a certain period of time (15 seconds, for example) or longer, the operation is performed in the copy mode.

Figure 6:
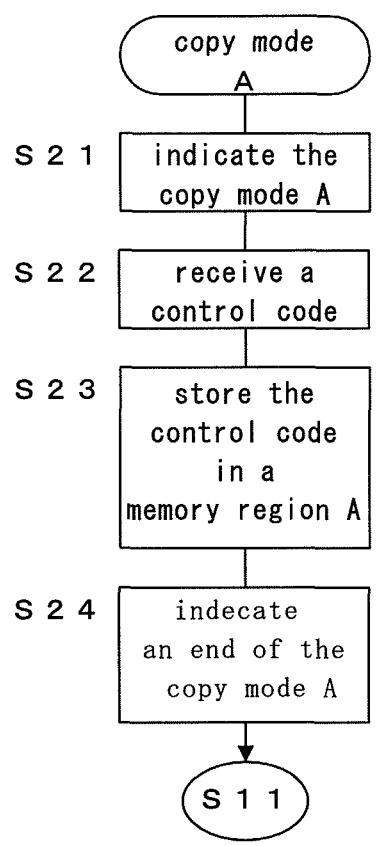
FIG. 6 is a flowchart of a control operation to be performed in a copy mode.

FIG. 6 is a flowchart showing an operation to be performed in a copy mode A in a case where the operation button A is pressed for a long period of time. The same operation is also to be performed in a copy mode B and a copy mode C for the other operation buttons B and C.

During the operation in the copy mode, the indicator 5d may be blinked or the like (S21, S24), so as to notify the user of the copying result and that the in-vehicle wireless system is in a copy mode.

After the start of the operation in the copy mode, the system stands by until the wireless signal Ta is transmitted by the user operating the remote control transmitter 2. When the wireless signal Ta is received by the receiving unit 20, the control code is detected (S22). After necessary procedures such as data format checking are carried out, the control code (hereinafter referred to as the control code A) is stored in a region A of the memory 12 (S23).

After the operation in the copy mode A is ended, the operation returns to the monitoring loop (S11) for monitoring the operation buttons.

Figure 7:
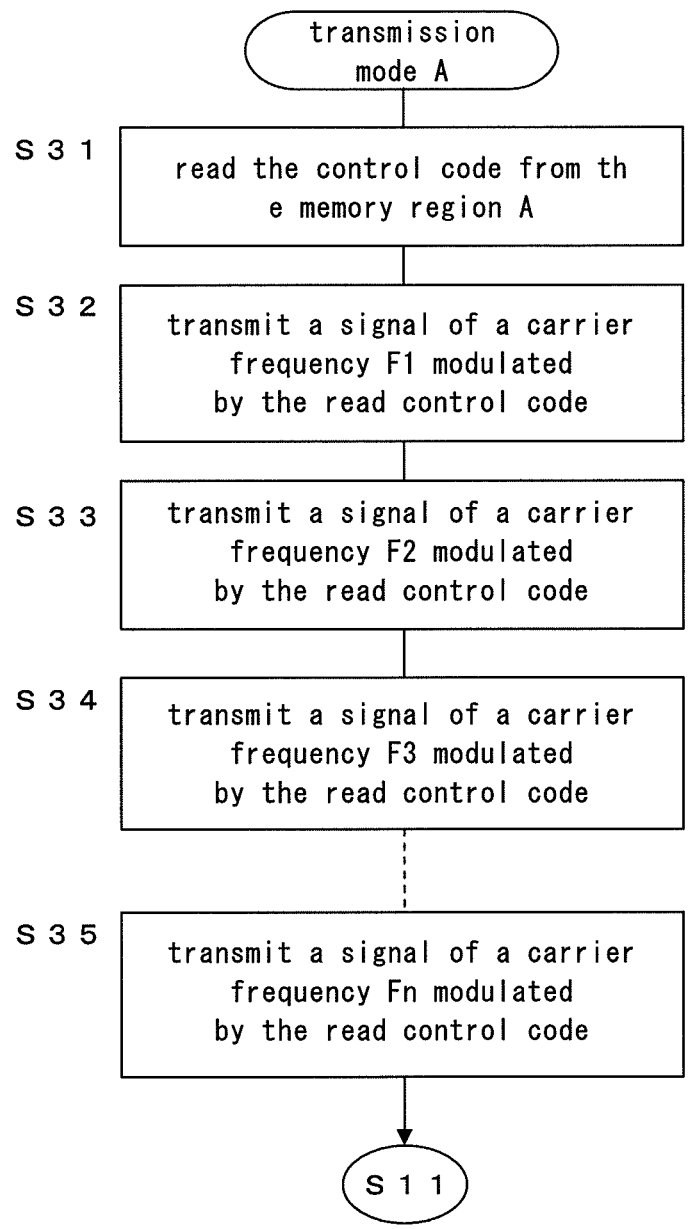
FIG. 7 is a flowchart of a control operation to be performed in a transmission mode.

FIG. 7 is a flowchart showing an operation to be performed in a transmission mode A in a case where the operation button A is pressed for a short period of time. The same operation is performed in a transmission mode B and a transmission mode C for the other operation buttons B and C.

In the transmission mode A, the control code A stored in the region A of the memory 12 is read out (S31).

A wireless signal of a carrier frequency F1 modulated by the control code A is transmitted by the transmitting unit 40 (S32). More specifically, in this step, the frequency setting signal for setting the carrier frequency F1 is output to the VCO circuit 41 of the transmitting unit 40, and the bit string of the control code A is sent to the modulation circuit 45.

The same transmissions as the transmission in step S32 are sequentially performed for carrier frequencies F2, F3, . . . , and Fn (S33, S34, S35), and the control code A is transmitted at all the carrier frequencies. The operation then comes to an end.

Figure 8:
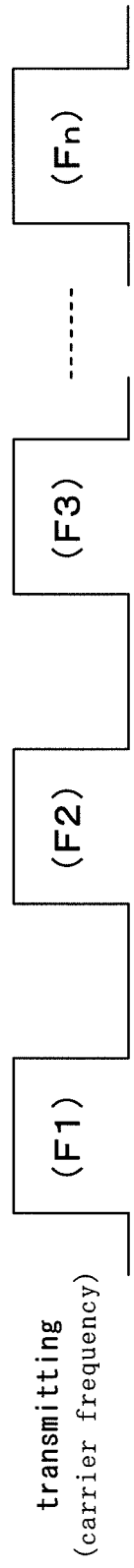
FIG. 8 is a timing chart schematically showing transmission of high-frequency wireless signals in the transmission mode.

FIG. 8 is a timing chart schematically illustrating the above transmission in the transmission mode.

After the operation in the transmission mode A is ended, the operation returns to the monitoring loop (S11) for monitoring the operation buttons.

The control procedures for transmissions at the carrier frequencies may be determined in advance. More specifically, the transmission may be performed in ascending order of frequency, starting from the carrier frequency F1 and ending with the carrier frequency Fn. The transmission may be performed in descending order of frequency. Alternatively, the garage door opening-closing mechanisms and the likes may be divided into groups, and the transmission may be performed in order of carrier frequency unique to the garage door opening-closing mechanisms and the likes in each target group. In this manner, the possibility of faster transmission to the target garage door opening-closing mechanism or the like can be made higher.

Figure 9:
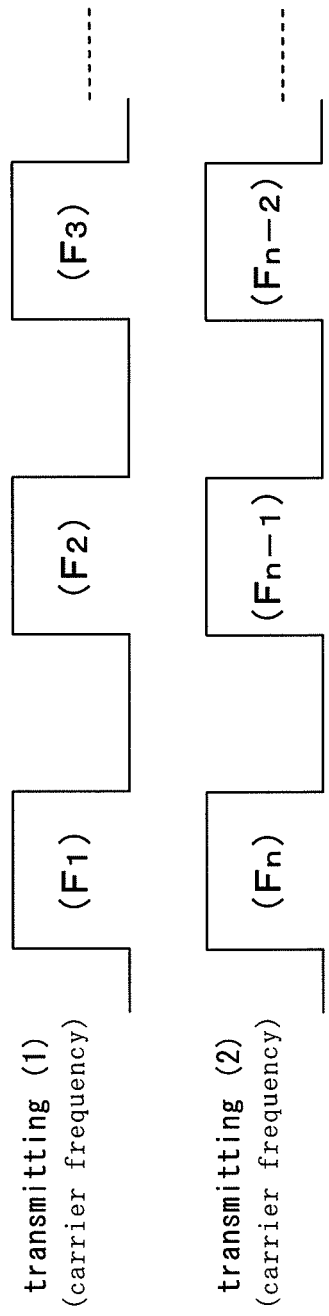
FIG. 9 is a timing chart schematically showing simultaneous transmission of high-frequency wireless signals at different carrier frequencies from two transmitting units.

In a case where the in-vehicle wireless system 8 includes two transmitting units 40 and 60, the two transmitting units alternately perform transmission at the same carrier frequency. Furthermore, as shown in FIG. 9, the two transmitting units may be controlled to perform transmission at different carrier frequencies (transmission (1), transmission (2)) at the same time. As transmission is performed at different carrier frequencies at the same time, the time required for transmission at all the carrier frequencies can be shortened.

The in-vehicle wireless system may have a maintenance mode for changing the garage door opening-closing mechanisms and the likes to be controlled, or the order of the control procedures. For example, the operation can move on to the maintenance mode when the operation button 5*a*, 5*b*, or the like is operated in a particular manner. In the maintenance mode, the receiving unit 20 can receive an update code that is transmitted in the form of a wireless signal. Accordingly, the maintainability of the in-vehicle wireless system can be increased, and, even if the garage door opening-closing mechanisms and the likes are modified, users can continue to use those mechanisms.

The following is a description of specific embodiments of the present invention.

First Embodiment

Figure 10:
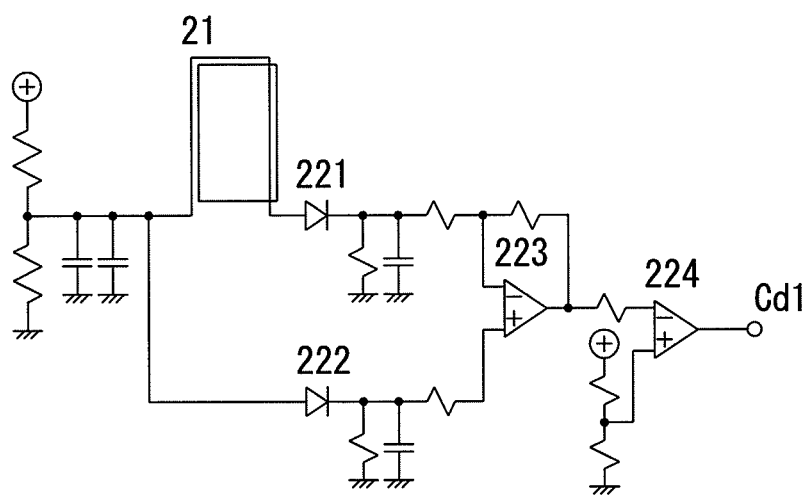
FIG. 10 is a circuit diagram showing the structure of a receiving unit in accordance with a first embodiment.

FIG. 10 is a circuit diagram showing a specific example design of the receiving unit 20. This receiving unit 20 includes the reception antenna 21, diodes 221 and 222, the operational amplifier 223, the comparator 224, and peripheral devices.

The reception antenna 21 is a coil-like loop antenna. Each high-frequency signal received by this antenna is detected by the high-frequency diode 221. Since the forward voltage of a high-frequency diode greatly varies with temperature, temperature compensating is performed with the use of the high-frequency diode 222, as mentioned above. The detected signal is amplified by the operational amplifier 223, and is binarized and shaped by the comparator 224. The signal is then output as the control code signal Cd1.

To increase the sensitivity of the receiving unit 20, an amplifier circuit and a bandpass filter that filters signals in the target frequency band may be provided between the reception antenna 21 and the detection circuit.

Also, a comb-like bandpass filter circuit that filters carrier frequencies separately from one another may be provided after the reception antenna 21, so as to improve the performance of the receiving unit 20.

Second Embodiment

Figure 11:
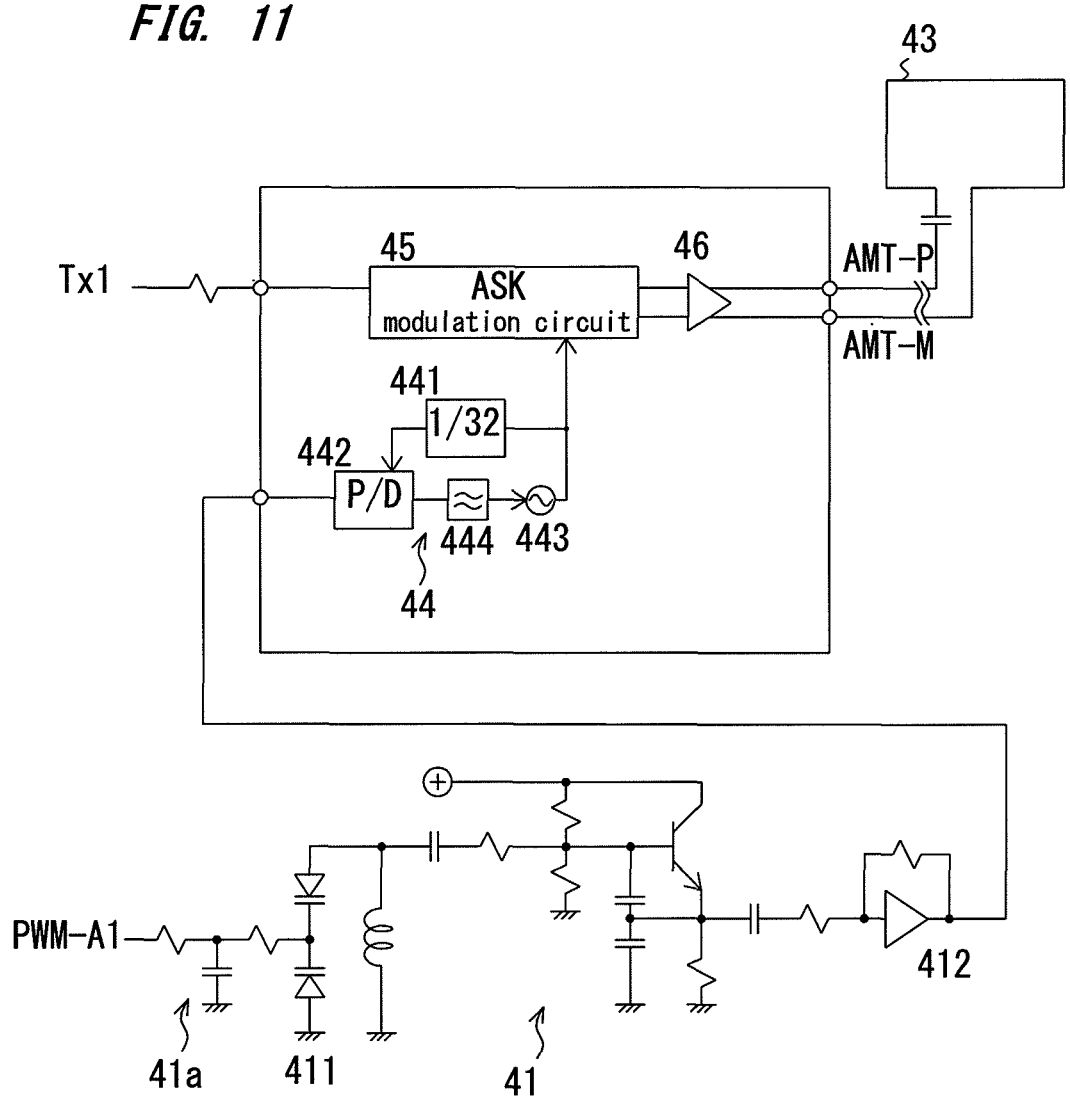
FIG. 11 is a circuit diagram (including a block diagram) showing the structure of a transmitting unit in accordance with a second embodiment.

FIG. 11 is a circuit diagram showing a specific design example of the transmitting unit 40. This transmitting unit includes a PWM signal smoothing circuit 41*a*, the VCO circuit 41, the PLL circuit 44, the ASK modulation circuit 45, the amplifier circuit 46, and the transmission antenna 43.

The PWM signal (PWM-A1) that is output from the microcontroller 11 of the control unit 10 is smoothed by the smoothing circuit 41*a*. The capacitance of the variable capacitance diode 411 varies with the voltage generated at this point, and the oscillation frequency of the VCO circuit 41 changes.

The output of the VCO circuit 41 is input to the PLL circuit 44 via a buffer circuit 412.

The PLL circuit 44 includes a phase comparator 442, a low-pass filter 444, a voltage controlled oscillator circuit 443, and a divider 441 that divides the frequency of each input signal by 32. The PLL circuit 44 generates a signal of a frequency 32 times higher than the frequency of the signal that is output from the VCO circuit 41.

When the oscillation frequency of the VCO circuit 41 is changed from 8.75 MHz to 13.125 MHz by changing the pulse width of the PWM signal, the PLL circuit 44 can generate a high-frequency signal of a frequency between 280 MHz and 420 MHz. This high-frequency signal is supplied to the modulation circuit 45.

The transmission code signal Tx1 that is output from the microcontroller 11 is input to the modulation circuit 45. The high-frequency signal supplied from the PLL circuit 44 is ASK-modulated with the transmission code signal Tx1 by the modulation circuit 45. The modulated high-frequency signal is amplified by the amplifier circuit 46, and is then supplied to the transmission antenna 43.

Third Embodiment

Figure 12:
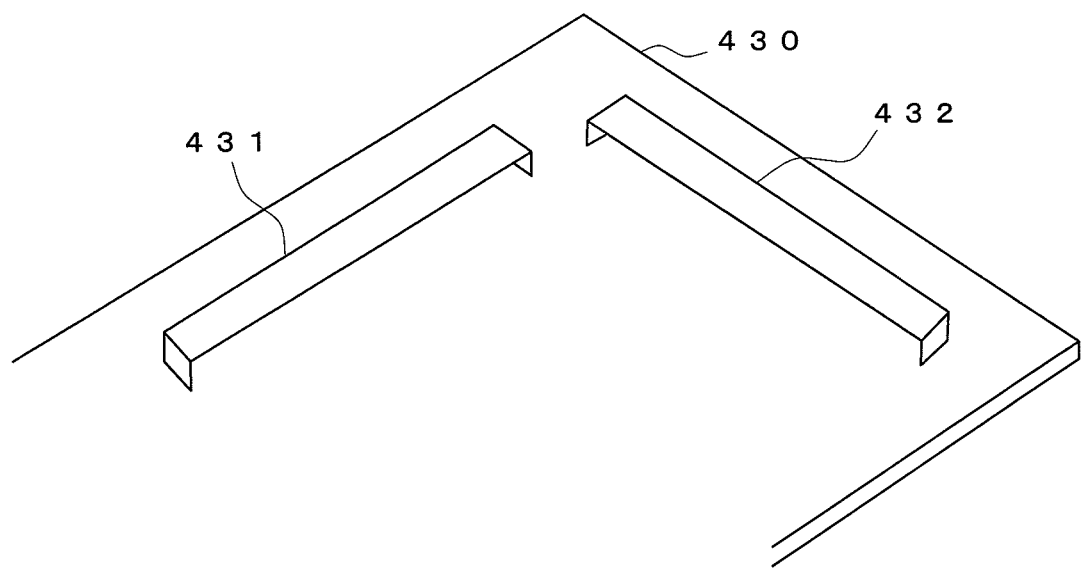
FIG. 12 shows an example arrangement of two transmission antennas in accordance with a third embodiment.

FIG. 12 shows an example arrangement of transmission antennas for performing diversity transmission. Two loop antennas 431 and 432 are placed at a distance from each other and perpendicularly to each other on a substrate 430, so as to provide spatial diversity. The positions of the feeding points of the respective antennas can be differentiated from each other so as to differentiate the polarizations of the transmission waves sent from the respective antennas.

Fourth Embodiment

Figure 13:
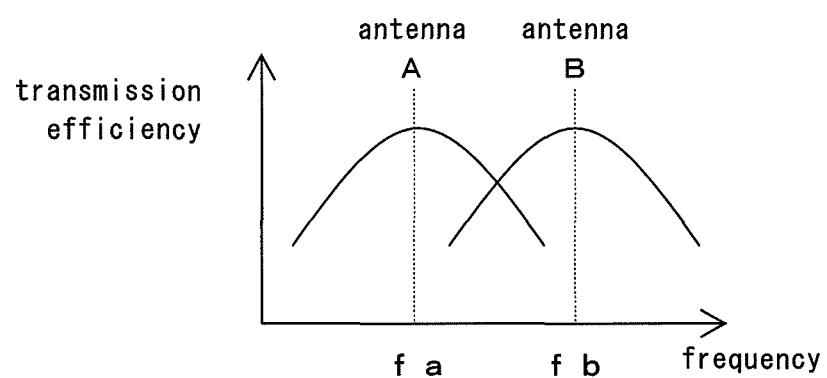
FIG. 13 schematically shows the frequency characteristics of two transmission antennas in accordance with a fourth embodiment.

FIG. 13 shows an example of the frequency characteristics of a transmission antenna A and a transmission antenna B having different center frequencies from each other. The antenna A has a center frequency fa on the lower frequency side in the target frequency band, and the antenna B has a center frequency fb on the higher frequency side in the target frequency band. By using the two antennas in combination, the transmission efficiency in the entire band can be made higher.

Fifth Embodiment

Figure 14:
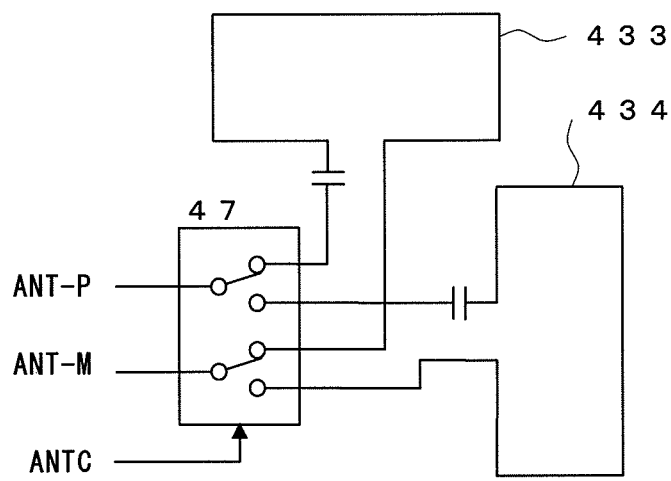
FIG. 14 is a circuit diagram showing an example structure that switches between two transmission antennas for transmission in accordance with a fifth embodiment.

FIG. 14 shows an example circuit of the transmitting unit that includes the antenna switching circuit 47 and two antennas 433 and 434. A signal ANTC to be input to the antenna switching circuit 47 is output from the microcontroller 11. The antenna switching circuit 47 may be formed with a high-frequency relay, but may also be formed with a high-frequency diode or the like. The microcontroller 11 switches between the antennas, and the high-frequency signal is transmitted from one of the antennas.

Sixth Embodiment

To optimize radio wave transmission, a transmission antenna unit including the transmission antenna 43 may be placed at a distance from the main body of the in-vehicle wireless system 8. In such a case, the transmission antenna unit and the output circuit of the main body are connected to each other with high-frequency cables, and a high-frequency signal is supplied to the transmission antenna unit through the cables. In this arrangement, the diversity transmission and antenna impedance matching can also be performed.

Figure 15:
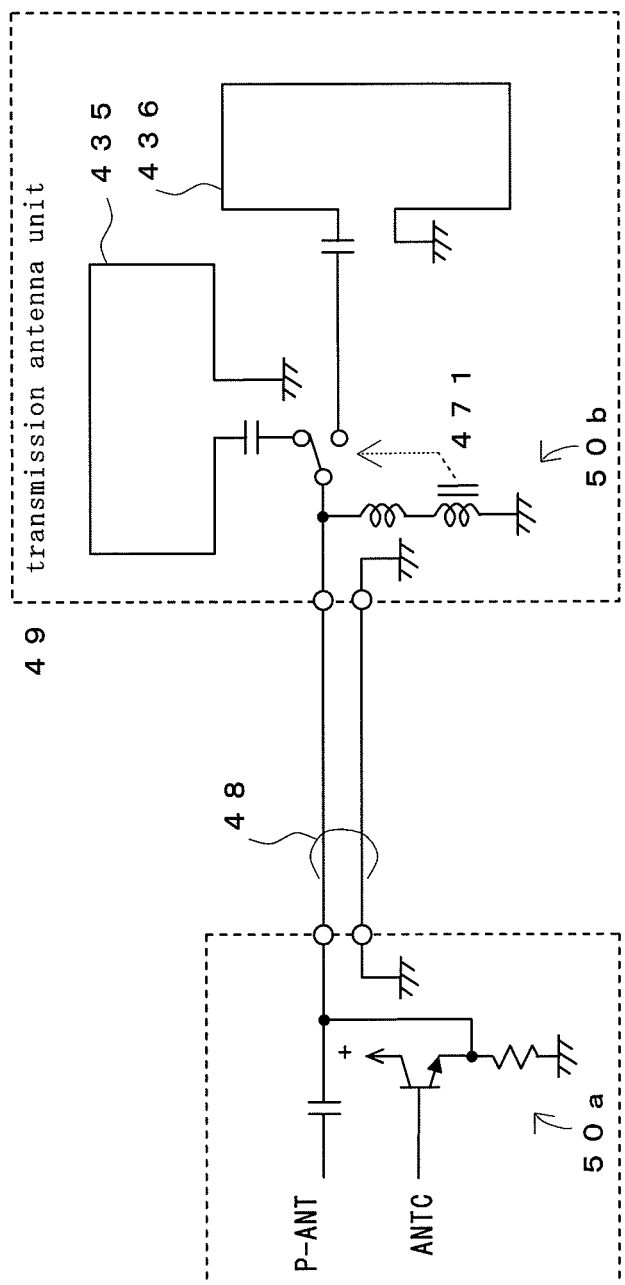
FIG. 15 is a circuit diagram showing an example structure that switches between two transmission antennas provided for transmission in a transmission antenna unit placed at a distance in accordance with a sixth embodiment.

FIG. 15 shows an example case where the transmission antenna unit 49 placed at a distance is connected to the output circuit with a high-frequency cable 48. The transmission antenna unit 49 has two antennas 435 and 436 and an antenna switching circuit 50b. A relay 471 provided in the antenna switching circuit 50b switches between the antennas. The main body of the in-vehicle wireless system has an antenna switch signal superimposing circuit 50a for superimposing a DC signal on a high-frequency signal (P-ANT) and transmitting the superimposed signal. The switch signal ANTC that is output from the microcontroller 11 is superimposed as the DC signal on the high-frequency cable 48, so that the antenna switching can be performed by the relay 471.

Seventh Embodiment

To prevent an increase in loss due to the frequency characteristics of an antenna, an impedance matching circuit formed with a variable capacitance diode or the like may be provided in the transmission antenna unit 49.

Figure 16:
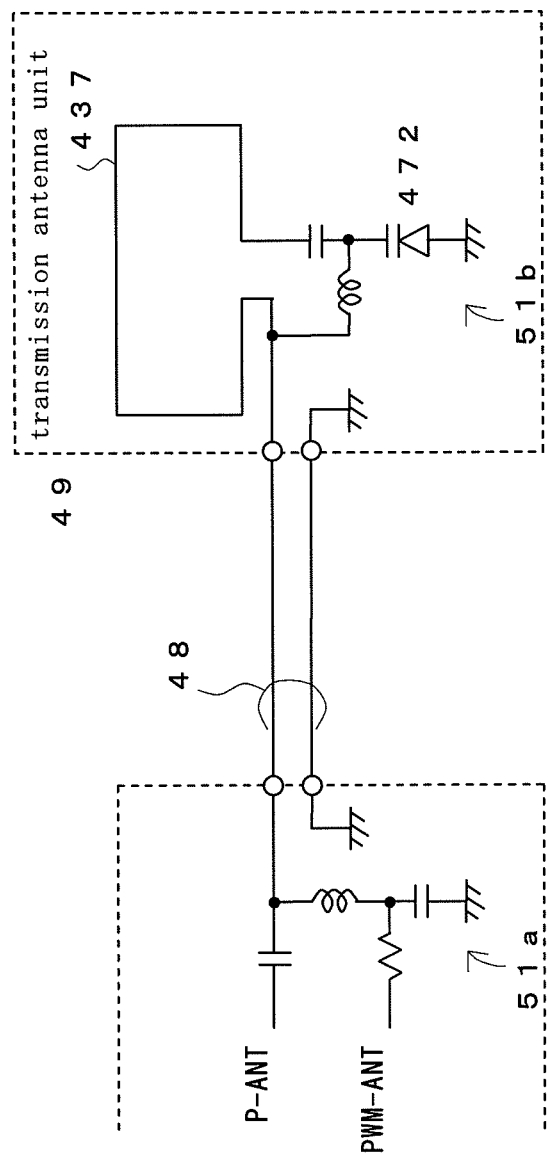
FIG. 16 is a circuit diagram showing an example structure employed in a case where impedance matching is performed on a transmission antenna provided in a transmission antenna unit placed at a distance in accordance with a seventh embodiment.

FIG. 16 shows an example case where an antenna 437 and an impedance matching circuit 51b are provided in the transmission antenna unit 49 placed at a distance. The impedance matching circuit 51b has a variable capacitance diode 472. The main body of the in-vehicle wireless system 8 has an impedance matching signal superimposing circuit 51a for superimposing a DC signal on a high-frequency signal (P-ANT) and transmitting the superimposed signal. The DC voltage that is obtained by smoothing the PWM signal (PWM-ANT) output from the microcontroller 11 is superimposed on the high-frequency cable 48 by the superimposing circuit 51a, and the capacitance of the variable capacitance diode 472 is varied in accordance with the DC voltage value. In this manner, antenna impedance matching can be performed in accordance with the carrier frequency of the signal transmitted from the microcontroller 11.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An in-vehicle wireless system that is placed in a vehicle so as to control a plurality of devices including a garage door opening-closing mechanism or household equipment that are remotely controlled by a high-frequency wireless signal, and is capable of operating at least in a copy mode and in a transmission mode, the plurality of devices respectively having predetermined carrier frequencies that are different from each other and unique to the respective devices, the in-vehicle wireless system comprising:

at least one receiver that receives a wireless signal transmitted from a remote control transmitter for performing control on the garage door opening-closing mechanism or the household equipment through a reception antenna without a tuning circuit, and demodulates a control code signal for detecting only a control code from the received signal;

a transmitter that transmits wireless signals modulated with a single control code at different carrier frequencies through a single transmission antenna; and a controller that controls the at least one receiver and the transmitter, wherein the controller, in the copy mode, detects the control code from the control code signal and stores only the control code, and the controller, in the transmission mode, controls the transmitter to perform transmission of a wireless signal modulated with the stored control code, the transmission of the modulated wireless signal being performed sequentially through the single transmission antenna at all the predetermined carrier frequencies unique to the respective devices, including the garage door opening-closing mechanism or household equipment in accordance with predetermined procedures.

2. The in-vehicle wireless system according to claim 1, wherein:

the wireless signal transmitted from the remote control transmitter is an ASK-modulated high-frequency signal; and the receiver includes an envelope detection circuit that is connected to the reception antenna.

3. The in-vehicle wireless system according to claim 2, wherein:

the receiver further includes a comparator circuit that compares an output signal of the envelope detection circuit with a reference voltage; and the controller includes a microcontroller that has a digital input having an output signal of the comparator circuit input thereto.

4. The in-vehicle wireless system according to claim 2, wherein the controller includes a microcontroller that has an analog input having an output signal of the envelope detection circuit input thereto.

5. The in-vehicle wireless system according to claim 1, wherein:

the controller includes a carrier frequency setter that generates a frequency setting signal for selecting the carrier frequency; and the transmitter includes a voltage controlled oscillator circuit that is controlled with the frequency setting signal, and an output circuit that multiplies the frequency of an output signal of the voltage controlled oscillator circuit and ASK-modulates the output signal.

6. The in-vehicle wireless system according to claim 5, wherein:
the transmitter further includes a plurality of transmission antennas and an antenna switching circuit that switches between the transmission antennas; and
the controller switches between the transmission antennas to be used by outputting an antenna select signal to the antenna switching circuit.

7. The in-vehicle wireless system according to claim 6, wherein each of the transmission antennas has a different antenna center frequency or a different transmission wave polarization from the other transmission antennas.

8. The in-vehicle wireless system according to claim 1, wherein the transmitter includes a plurality of transmitters,
each of the transmitters includes a transmission antenna having a different antenna center frequency or a different transmission wave polarization from a transmission antenna of the other transmitters.

9. The in-vehicle wireless system according to claim 1, wherein the transmitter includes a plurality of transmitters,
the transmitters transmit the wireless signals at the same carrier frequency from all the transmitters in turn.

10. The in-vehicle wireless system according to claim 1, wherein the transmitter includes a plurality of transmitters,
the transmitters simultaneously transmit the wireless signals at the different carrier frequencies.

11. The in-vehicle wireless system according to claim 1, wherein the predetermined procedures are carried out to perform transmitting the wireless signals successively in ascending or descending order of the carrier frequency.

12. The in-vehicle wireless system according to claim 10, wherein the predetermined procedures are carried out so that one of two transmitters of the plurality of transmitters performs transmitting the wireless signals successively in ascending order of the carrier frequency, and the other one of the two transmitters performs transmitting the wireless signals successively in descending order of the carrier frequency.

13. The in-vehicle wireless system according to claim 2, wherein:
the at least one receiver include a plurality of receivers,
each of receivers has a reception antenna having a different reception sensitivity with respect to a center frequency or wave polarization from reception antennas of an other of the receivers; and
the controller detects the control code by selecting or processing the control code signals that are input from the respective receivers.

14. The in-vehicle wireless system according to claim 6, further comprising
a transmission antenna unit that includes the transmission antennas and is spaced from the output circuit,
wherein:
the transmission antenna unit is connected to the output circuit with a high-frequency cable, the controller includes a circuit that superimposes the antenna select signal as a DC voltage on the high-frequency cable; and
the transmission antenna unit includes the antenna switching circuit that is activated by a value of the DC voltage.

15. The in-vehicle wireless system according to claim 5, further comprising
a transmission antenna unit that includes the single transmission antenna and is spaced from the output circuit,
wherein:
the transmission antenna unit is connected to the output circuit with a high-frequency cable,
the controller includes a circuit that superimposes an impedance matching signal as a DC voltage on the high-frequency cable, the impedance matching signal being for impedance matching with the single transmission antenna; and
the transmission antenna unit includes the impedance matching circuit that is activated by a value of the DC voltage.

16. The in-vehicle wireless system according to claim 1, wherein the controller receives data for updating the garage door opening-closing mechanism or household equipment or the control procedures through the receiver, and changes the carrier frequency and/or the control procedures in accordance with the data.

17. The in-vehicle wireless system according to claim 3, wherein:
the controller includes a carrier frequency setter that generates a frequency setting signal for selecting the carrier frequency; and
the transmitter includes a voltage controlled oscillator circuit that is controlled with the frequency setting signal, and an output circuit that multiplies the frequency of an output signal of the voltage controlled oscillator circuit and ASK-modulates the output signal.

18. The in-vehicle wireless system according to claim 17, wherein the predetermined procedures are carried out to perform transmitting the wireless signals in ascending or descending order of the carrier frequency.

* * * * *